Patented Mar. 7, 1933

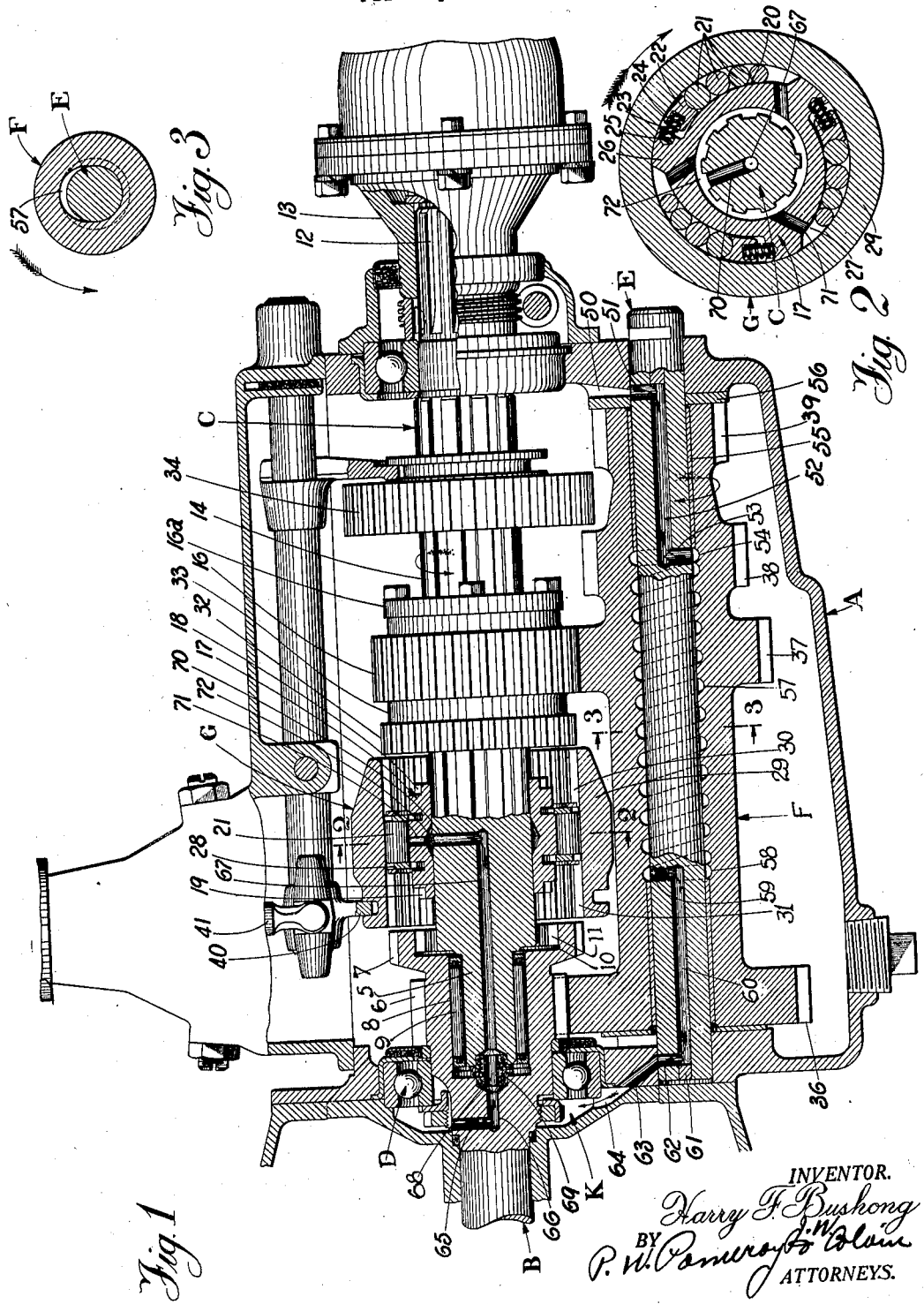

1,900,096

UNITED STATES PATENT OFFICE

HARRY F. BUSHONG, OF SOUTH BEND, INDIANA, ASSIGNOR, BY MESNE ASSIGNMENTS, TO FREE WHEELING PATENTS CORPORATION, OF SOUTH BEND, INDIANA, A CORPORATION OF DELAWARE

TRANSMISSION

Application filed April 8, 1931. Serial No. 528,586.

This invention relates to improvements in lubricating systems for variable speed transmissions and deals more specifically with means for lubricating the gear and clutch elements in a free wheeling type of transmission.

In a free wheeling type of transmission one or more one-way acting clutch structures are provided to permit the driven shaft to overrun under its own momentum relative the drive shaft. In some transmissions of this type, independent clutch structures are provided for any desired number of different speed drives, while in others the clutch structures for two drives are combined in different ways to eliminate as far as possible some of the elements which are duplicated in structures embodying independent clutch elements. The actual use of transmissions, including over-running clutch elements as stock equipment in motor vehicles presents a new problem in transmission lubrication, and that problem requires particular consideration when independent clutch structures are used and especially when the clutch structures for two drives are combined as noted above. It has been found that the splash of lubricant in the transmission casing usually relied upon to lubricate the gears of the various speed drives is not sufficient to properly lubricate the clutch structures and particularly the combined types due to the extreme compactness of the same and also to the fact that some of the clutch elements are enclosed within a larger element which to a considerable extent shields the inside elements from the lubricant.

It is therefore, a primary object of this invention to provide a new system for lubricating the overrunning structure or structures and the gears of variable speed transmissions.

A further object of this invention is to provide a novel form of pump for forcing lubricant to the various parts of a variable speed transmission, the pump preferably being actuated by the normal operation of the transmission mechanism without the use of any intermediate transmission or drive for the pump.

A still further object of the invention is the provision of a lubricant feeding pump for a transmission which requires no separate casing or housing structure, the pump being built into the transmission mechanism so as to be housed thereby.

It is a further object of the invention to so modify certain standard parts of the transmission mechanism that these parts may be utilized to serve as part of the pump structure thereby eliminating the necessity of adding additional mechanical elements to the transmission mechanism.

Another object of the invention is to provide a lubricating system for transmissions which is of exceedingly simple construction, one which will operate without any special attention or consideration on the part of the owner of the vehicle equipped with the same, and one which may be built into a transmission without material alteration of any of the elements of the latter.

Other objects and advantages of the invention will be apparent during the course of the following description.

In the accompanying drawing forming a part of this specification and in which like numerals are employed to designate like parts throughout the same;

Figure 1 is a vertical longitudinal sectional view of a transmission including an overrunning clutch structure for certain forward speed drives, and a special lubricating system for said clutch structure and/or some of the gear elements.

Figure 2 is a sectional view on the line 2—2 of Figure 1.

Figure 3 is a sectional view on the line 3—3 of Figure 1.

Briefly describing the invention for the purpose of enabling those skilled in the art to readily understand the mode of operation of the invention; the same consists of a transmission casing or housing A having suitably mounted thereby, a drive shaft B, and a driven or transmission shaft C. These shafts B and C are arranged in axial alignment with each other and are telescopically associated at their adjacent ends and supported in the casing A through the medium of the anti-friction bearing structure D. A countershaft E is mounted in the casing A and has associated therewith a sleeve F which rotates relative the countershaft E and carries various gears included in the different speed drives.

A combined one-way acting clutch structure and drive connection G is provided for establishing connections for two different speed drives from the drive shaft B to the driven shaft C. This unit G permits the driven shaft to be driven by the drive shaft at two different forward speeds and also permits or prevents, at the will of the operator, the driven shaft to over-run under its own momentum, relative the drive shaft.

The various gears forming the different speed drives of a transmission usually are lubricated by the splash of lubricant caused by the relative rotation of the various gears. It has been determined that the clutch structures incorporated in an overrunning clutch type of transmission do not receive sufficient lubrication if the ordinary splash method alone is relied upon. For this reason, a force feed pump structure is provided for feeding lubricant through a system of passages to the clutch structure or structures. This system of passageways, if desired, may include one or more of the sets of gears forming a part of the different speed drives.

The invention now will be described in detail for affording a complete understanding of all the various elements, features of construction and mode of operation:

The transmission casing or housing A may take any desired form and is designed to permit the drive shaft B to project into the interior of the same at one end thereof. The outer end of this drive shaft is intended to be connected to an engine or prime mover of any suitable form and preferably through a controllable clutch structure, not shown. The inner end of the drive shaft B is supported by the anti-friction bearing structure D and has formed thereon a gear 6. Inwardly of the gear 6, the drive shaft B is increased in diameter and has formed on its periphery a set of clutch teeth 7. The portion of the drive shaft B having formed thereon the gear 6 and the clutch teeth 7 is hollowed out to provide a bearing receiving pocket 8, within which an anti-friction bearing structure 9 is positioned. This hollowed out portion 8 of the drive shaft is increased in diameter, as at 10, to form a concentric enlargement of the hollowed out portion. An annular set of clutch teeth 11 is formed on the inner wall of this portion 10 and in radial alignment with the set of clutch teeth 7.

The driven shaft C projects through the rear end of the gear casing or housing A in axial alignment with the drive shaft B. The outer end 12 of this driven shaft is adapted to have suitably secured thereto a driving collar or flange 13 for connection with the element or elements to be driven from the transmission, such as the rear wheels of a motor vehicle. The interior or intermediate portion of the driven shaft C is splined at 14 and this spline formation extends substantially the full length of the same except the portion thereof receiving the gear 16 and its associated parts. The inner extremity of the driven shaft is reduced in diameter at 15 for entering the anti-friction bearing structure as mounted in the recessed portion 8 of the drive shaft. This telescopic arrangement of the adjacent ends of the drive and driven shafts permits the same to support each other through the medium of the anti-friction bearing 9 and to maintain relative axial alignment and permit relative rotation.

The gear 16 is mounted upon the driven shaft C and is supported by the latter in a manner to permit relative rotation thereon. On one side of this gear is an element 16ª which is adapted to prevent axial movement of the gear upon the shaft. Any suitable means for mounting the gear to permit free rotation of the gear about the shaft and at the same time prevent axial motion of the gear relative to the shaft, may be employed.

Splined upon the driven shaft between the end of the drive shaft and the gear 16 is a clutch element 17. This element is permitted to have axial movement relative to the driven shaft. The opposite ends of the clutch element are formed with sets of clutch teeth 18 and 19 respectively. Intermediate these sets of clutch teeth the clutch element 17 is formed with a plurality of cam surfaces 20 which are preferably equi-spaced around the periphery of the clutch element 17. This specific structure is best illustrated in Figure 2. These cam surfaces 20 each have associated therewith a plurality of wedging rollers 21 which progressively vary in diameter. At one end of each set or series of rollers 21, a follower 22 is provided. This follower is urged toward its rollers by means of a spring 23 which is pocketed at 24, in the follower 22 at one end and is received at its other end in a pocket 25 formed in an abutment 26 on the inner clutch member 17.

It will be noted by inspecting Figure 2, that each cam surface 20 has associated therewith a set of rollers 21, a follower 22 and a spring 23. The action of the follower 22 with the spring 23 is to force the set of rollers toward the shallow ends 27 of the cam surfaces. Suitable retaining elements 28 are provided for preventing unintentional removal of the sets of rollers and followers from the cam surfaces.

A shifter collar 29 surrounds the clutch element 17 with its various sets of rollers 21 and followers 22. This shifter collar is formed at its opposite ends with sets of clutch teeth 30 and 31. The clutch teeth 30 are designed to cooperate with a set of clutch teeth 32 formed on an integral enlarged portion 33 of the gear 16. This enlarged portion 33 is hollowed out and is formed with a set of clutch teeth corresponding with the teeth 11 formed on the drive shaft B. The inner set of clutch teeth for the portion 33 is adapted to cooperate with a set of clutch teeth 18 formed on the clutch member 17. The set of clutch teeth 31 formed on the shifter collar 29 is adapted to associate with the set of clutch teeth 7 formed on the drive shaft B.

A shiftable gear 34 is supported on the driven shaft C and is splined thereto for effecting first and reverse speed.

The countershaft E has rotatably positioned thereupon a sleeve F for carrying a gear 36 constantly meshing with the gear 6 formed on the drive shaft B. A gear 37 is carried by the sleeve F and constantly meshes with the gear 16 rotatably supported upon the driven shaft C. Gears 38 and 39 also are carried by the sleeve F. The shiftable gear 34 on the driven shaft is adapted for movement into mesh with the gear 38 or with an idler pinion not illustrated, which meshes with the gear 39 for producing first and reverse speed drives.

This transmission is designed for producing three forward speed drives and a single drive in a reverse direction, the first or low speed drives being established by shifting the gear 34 into mesh with the gear 38.

When second or intermediate speed is desired, the clutch collar 29 is shifted toward the loose gear 16 through the medium of a shifter fork 40 which is connected to the shifter control 41. The collar is moved until its set of teeth 30 meshes with the set of teeth 32 formed on the exterior of the portion 33 of the gear 16. The second speed drive then is from the drive shaft B through the gears 6 and 36 to the sleeve F and from this sleeve through the gear 37 to the gear 16. The meshing clutch teeth 32 and 30 on the gear 16 and the clutch collar 29 establish a driving connection between this gear and the said collar. The clutch collar 29 then will be rotated in the direction of the arrow in Figure 2, which will cause the rollers 21 to wedge between the collar 29 and the inner clutch element 17 for interlocking these two members and for driving the clutch element 17. This element is splined to the driven shaft C and of course, will cause the driven shaft to rotate in the same direction of rotation as that of the drive shaft. If, for any reason, the driven shaft overruns or is driven at a higher rate of speed than that produced by its driving connection with the drive shaft, the inner clutch element 17 will rotate relative the clutch collar 29 in the direction of the arrow in Figure 2. This movement of the inner clutch element 17 will shift the cam surfaces 20 relative the wedging rollers 21 and will cause the rollers to be shifted to break their wedging connection between the shaft or clutch element 17 and the shiftable collar 29. The driven shaft C with its clutch element 17 therefore will be permitted to rotate independently of the clutch collar 29 and the gear 16. When the speed of rotation of the driven shaft drops back to the speed at which it will be driven from the drive shaft, the clutch will again take up the drive.

When it is desired to prevent this overrunning in second speed, the shifter collar 29 is moved to a greater extent toward the gear 16, and the set of clutch teeth 18 formed on the clutch element 17 will mesh with the set of clutch teeth formed on the interior of the enlarged portion 33 of the gear 16. The drive then will be from the gear 16 directly to the clutch element 17 and from this element directly to the driven shaft C with the result that the one-way acting clutch structure will be cut out of the connection.

To produce third or high speed, the clutch collar 29 is shifted toward the drive shaft B until the set of clutch teeth 31 engages the clutch teeth 7 on the enlarged portion of the drive shaft. The drive then will be from the drive shaft through the teeth 7 and 31 to the clutch collar 29 and through the sets of rollers 21 to the inner cam member 17 which is splined to the driven shaft C. As described in connection with the second or intermediate speed drive, the driven shaft, with the connection to the rollers 21, will be permitted to overrun under its own momentum relative to the drive shaft. This overrunning is brought about by force supplied to the driven shaft which will cause the inner clutch member 17 to be shifted in the direction of the arrow in Figure 2, relative the shifter collar 29. This relative movement will compress the springs 23 for permitting the followers 22 and the sets of rollers to shift relative the cam surfaces 20 toward the deeper ends of these surfaces. When the speed of rotation of the driven shaft drops back to the speed of the rotation of the drive shaft, the spring 23 will function to move the followers 22 and thereby the rollers 21 so that the latter will again wedge between the cam member 17 and the shifter collar 29.

When it is desired to prevent this overrunning of the driven shaft relative to the drive shaft, the shifter collar 29 is moved to a greater extent toward the drive shaft B and until the set of clutch teeth 19 formed on the clutch member 17 engages the set of clutch teeth 11 formed on the interior of the enlarged portion of the drive shaft. The drive shaft will then be locked against relative movement with respect to the clutch member 17 and due to the spline connection between this clutch member and the driven shaft, the driven shaft will be rotated at the same speed as that of the drive shaft and will be prevented from overrunning relative to drive shaft.

To provide for a drive in the reverse direction, the gear 34 is moved into mesh with the idler pinion, not shown, which is positioned beyond the gear 39 and is in mesh therewith. The reverse drive extends from the drive shaft B through the gears 6 and 36 to the sleeve F, and from the gear 39 through the idler pinion to the gear 34 splined to the driven shaft C.

In variable speed transmissions the various sets of driving gears normally are lubricated by being submerged in a bath of lubricant contained in the housing A. The relative motion of the gears sets up a splashing action which thoroughly distributes the lubricant and lubricates all the gears. It has been found that this normal splash of lubricant is not sufficient to lubricate the elements of the overrunning clutch structure and for this reason a force feed is desirable.

In this case the forced feed consists of a pump which comprises the elements and mode of operation as follows:

As described above, the sleeve F carrying gears 36, 37, 38 and 39 rotates on the fixed countershaft E and it is the purpose of this invention to make use of the relative rotation between the sleeve F and countershaft E, to force the lubricant into the overrunning clutch mechanism G. To this end, there is provided in the bearing boss which supports the countershaft E at the rear end of the housing, a well 50 which communicates at its upper end with the interior of the transmission housing, and at its lower end, is in communication with a transverse bore 51, leading from the surface to the center of the countershaft E. From the inner end of the transverse bore 51, an axial bore 52 is drilled through the countershaft for a distance of about one-fourth of the length of the countershaft. The forward end of the axial bore 52 communicates with the transverse bore 53, which in turn communicates with a groove 54 provided in the inner surface of the sleeve F. Between the rearward edge of the groove 54 to the rear end of the sleeve F, there is provided a bushing 55 between the sleeve F and the shaft E. At the rear end of the sleeve F, a thrust member 56 in the form of a washer, is inserted between the rear end of the sleeve and the transmission housing A. A spiral groove 57 is provided in the inner surface of the sleeve F beginning at the forward edge of the groove 54 and extending for a distance about one-half of the length of the shaft E to another groove 58 provided in the inner surface of the sleeve F. Alternatively the grooves 54 and 58 and the spiral groove 57 might be formed in the surface of the shaft E without in any way effecting the operation of the device. From the groove 58 a transverse bore 59 leads to the center of the shaft E where it communicates with an axial bore 60 which extends to a point adjacent the front end of the shaft E, communication of the bore 60 to the front end of the shaft E being prevented by a plug 61. The front end of the bore 60 communicates with a transverse bore 62 which leads to the surface of the shaft E and there communicates with a bore 63 drilled diagonally through the transmission housing 10 adjacent to the anti-friction bearing D.

Surrounding the anti-friction bearing D and between said bearing and the transmission housing is a space K which serves as a reservoir. A channel 64 is cut in the housing to connect the upper end of the bore 63 to the reservoir K. A transverse bore 65 is drilled in the drive shaft B in such a position that the upper end of the bore 65 communicates with the reservoir K. This bore 65 extends to the center of the shaft and to this point, an axial bore 66 is drilled from the center of the recess 8 provided in the shaft B. An axial bore 67 is drilled in the driven shaft C from the front end thereof to a point immediately beyond the center of the member 17. The rearward end of the bore 66 and the forward end of the bore 67 are countersunk and between these countersunk bores is provided a short tube 68 and a packing 69 to provide a continuous conduit between the two shafts. At the central portion of the member 17, a transverse bore 70 is drilled in the driven shaft C, the bore 70 communicating at the inner end with the rearward end of the axial bore 67, and at its outer end with the surface of the driven shaft C. A bore 71 is provided in the member 17 to form a continuation of the bore 70 and a recess 72 is provided in the inner surface of the member 17 surrounding the bore 71 so that sliding of the member 17 relative to the shaft C during shifting will not be effective to close the end of the bore 70. The bore 71 communicates with the clutch elements 21.

The operation of the device is as follows: The lubricant enters the well 50 and passes through the bores 51, 52 and 53 to the groove 54 where it is picked up by the spiral groove 57 and owing to the relative rotation of the sleeve F and shaft E, it is forced forwardly into the groove 58 and from there through bores 59, 60, 62, 63 and 64 into the reservoir K. From the reservoir K the lubricant enters the bore 65 and passes through bores 65, 66, tube 68, bores 67, 70 and 71 to the overrunning clutch mechanism from where it flows on to the member 29 and from the edge of the member 29 is thrown back into the transmission housing.

It will be noted that the combined lengths of bores 70 and 71 is somewhat greater than the length of the bore 65 and owing to this fact the rotation of shaft C will cause to be exerted a centrifugal action which will tend to throw the lubricant out of the recess 72 and draw lubricant into the bore 65.

It will be noted that the pump will function whenever the transmission is in operation so that lubricant will be supplied to the overrunning clutch mechanism whenever it is in motion. The one-way acting clutch structure therefore, will be supplied with lubrication whenever it is functioning thereon either the second or high speed drives.

It is to be understood that the form of this invention herewith shown and described, is to be taken as a preferred example of the same and that various changes in the shape, size and arrangement of parts may be resorted to without departing from the spirit of the invention and the scope of the sub-joined claims.

What I claim is:

1. In a vehicle transmission, a drive shaft, a driven shaft, and a countershaft, speed changing mechanisms including an overrunning clutch mounted on said drive and driven shafts, a countershaft sleeve rotatably mounted on said countershaft, and means operative upon rotation of said sleeve relative to said countershaft to force lubricant to said speed changing mechanisms.

2. In a vehicle transmission, a pair of aligned shafts, an overrunning clutch mechanism on one of said shafts operatively engageable with the other of said shafts to provide a one-way driving connection between said shafts, a third shaft, a sleeve rotatable upon said third shaft, and means operative upon rotation of said sleeve to force the lubricant into said overrunning clutch mechanism.

3. In a vehicle transmission, a pair of aligned shafts, an overrunning clutch mechanism on one of said shafts operatively engageable with the other of said shafts to provide a one-way driving connection between said shafts, a third shaft, a sleeve rotatable upon said third shaft, and a screw pump operative upon rotation of said sleeve to force lubricant to said overrunning clutch mechanism.

4. In a vehicle transmission, a pair of aligned shafts, an overrunning clutch mechanism on one of said shafts operatively engageable with the other of said shafts to provide a one-way driving connection between said shafts, a third shaft, a sleeve rotatable upon said third shaft, and means comprising a spiral groove in said sleeve operative upon rotation of said sleeve to force lubricant to said overrunning clutch mechanism.

5. In a vehicle transmission, a pair of aligned shafts having channels therein, an overrunning clutch mechanism on one of said shafts operatively engageable with the other of said shafts to provide a one-way driving connection between said shafts, a third shaft, a sleeve rotatable upon said third shaft, and means operative upon rotation of said sleeve to force lubricant through said channels to said overrunning clutch mechanism.

6. In a vehicle transmission, a transmission casing having a channel therein, a pair of aligned shafts supported by said casing each having a channel therein, an overrunning clutch mechanism on one of said shafts operatively engageable with the other of said shafts to provide a one-way driving connection between said shafts, a third shaft supported in said casing, a sleeve rotatable upon said third shaft, and means operative upon rotation of said sleeve to force lubricant through said channels in said casing and shafts to said overrunning clutch mechanism.

7. In a variable speed transmission, a drive shaft having a channel therein, a driven shaft having a channel therein communicating with the channel in said drive shaft, an overrunning clutch mechanism mounted on said driven shaft operatively engageable with said drive shaft to provide a one-way driving connection between said shafts and having a lubricating connection with the channel in said driven shaft, a fixed countershaft having channels communicating at one end with the interior of the transmission and at the other end with the channel in said drive shaft, a sleeve rotatably mounted on said countershaft, and means between said sleeve and said countershaft for moving lubricant through said channels to said overrunning clutch mechanism.

8. In a vehicle transmission mechanism, a transmission casing having a channel therein, a drive shaft supported by said casing having an axial bore therein communicating with said channel, a driven shaft supported in said casing in alignment with said drive shaft and having an axial bore therein communicating with said bore in said drive shaft, means between the juxtaposed ends of said shafts connecting said bores, an overrunning clutch mechanism mounted on said driven shaft operatively engageable with said drive shaft to provide a one-way driving connection between said shafts and connected by a transverse bore with the axial bore in said driven shaft, a third shaft nonrotatably mounted in said casing having a channel in one end thereof communicating with the channel in said casing, a sleeve rotatably mounted on said third shaft having spiral grooves therein for forcing lubricant through said channels and said bores in said shafts to said overrunning clutch mechanism.

9. In a variable speed transmission, a transmission casing having a channel therein, a drive shaft supported by said casing having a channel communicating with the channel in said casing, a driven shaft supported in said casing having a channel communicating with the channel in said drive shaft, gears of varying diameters on said drive and driven shafts, an overrunning clutch mechanism mounted on said driven shaft operatively engageable with said drive shaft to provide a one-way driving connection between said shafts and having a lubricating connection with the channel in said driven shaft, a fixed countershaft mounted in said casing having a channel in one end thereof communicating with the channel in said casing, a gear carrying sleeve rotatably mounted on said countershaft, and means comprising a spiral groove in said sleeve for forcing lubricant through said channels to said overrunning clutch mechanism and said gears.

Signed by me at South Bend, Indiana, this 3rd day of April, 1931.

HARRY F. BUSHONG.